Patented May 14, 1929.

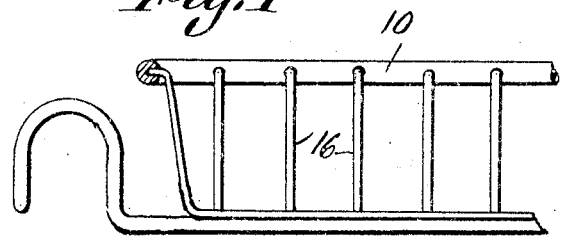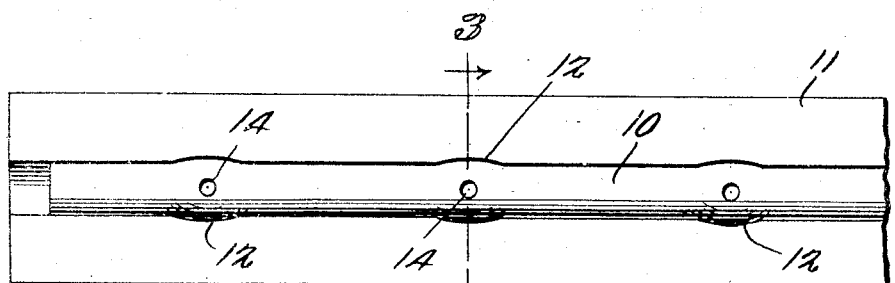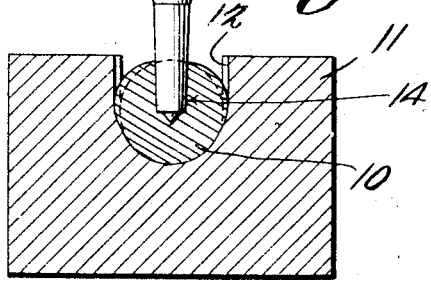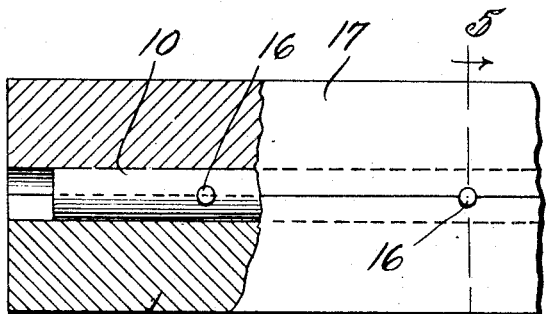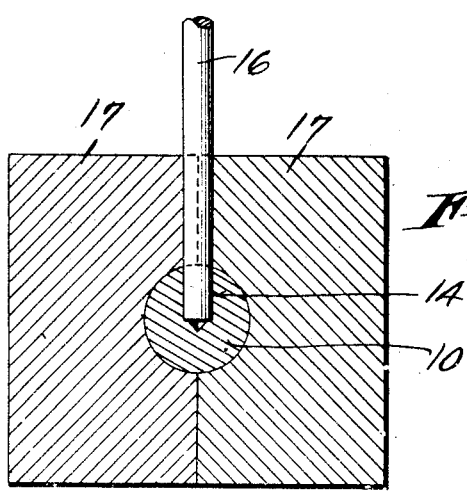

1,713,314

UNITED STATES PATENT OFFICE.

WALTER BRUCE WILLS, OF BALTIMORE, MARYLAND.

METHOD OF SECURING WIRES TOGETHER.

Application filed October 25, 1926. Serial No. 143,960.

This invention relates to the manufacture of wire articles such as soap dishes, dishdrainers and the like, and has special reference to the method of joining wires.

In the ordinary manner in which wires are joined, in making wire baskets and other like articles, it is common to wrap one wire about the other and usually to solder or spot-weld the wires at the wrapped points, it is also common to solder or spot-weld the wires together without the wrapping of one wire about the other. It is extremely difficult to enamel such articles evenly as the solder and the ends of the wires form sharp points and edges to which the enamel will not adhere and the joints present cracks in which the enamel tends to collect and form lumps in an endeavor to coat the wires with sufficient enamel to cover these sharp points.

The principal object of the present invention is to provide an improved method of joining wires in which the solder and spotwelding operation is eliminated and by which no cracks are formed at the junctions of wires, the joint being equal in strength to a soldered or spot-welded joint and so smooth that enamel can be applied thereto in a smooth and even manner requiring but few coats to produce a perfect finish.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a sectional view disclosing a portion of a wire tray wherein the wires are joined in accordance with this invention.

Figure 2 is an enlarged plan view showing a wire in its support and prepared in accordance with this invention.

Figure 3 is an enlarged section on the line 3—3 of Figure 2 showing the act of forming the recess which constitutes a step in this method.

Figure 4 is a plan view, partly in section showing dies for performing another step in the method.

Figure 5 is an enlarged section on the line 5—5 of Figure 4.

In the preferred manner of carrying out this invention a relatively large wire 10 is placed in a trough like support 11 so that it is supported on the bottom and sides except at places 12 at which the trough is laterally enlarged. A punch 13 is then driven or pressed into the wire to form a recess 14 at each enlarged portion of the supporting trough. The recess or hole extends substantially half way through the wire 10 and the wire is expanded laterally into the enlarged portions 12. Relatively small wires 16 now have their ends placed in these recesses and the wire 10, is placed, with the small wires in position, between a pair of grooved dies 17, and forcibly compressed so that it is restored to its original shape and the small wires are gripped tightly in the recesses.

As thus joined the joints between the small and large wires are smooth and without either projections or recesses.

There has thus been provided a simple, novel and highly efficient method of joining wires which permits the proper coating of articles thus formed with enamel and the like.

Having thus described the invention, what is claimed as new, is:

That method of uniting wires of different diameters which consists in partially penetrating and laterally spreading the wire of greater diameter by pressing a recess diametrically into the side thereof, inserting the end of the wire of smaller diameter into said recess, and finally compressing the first mentioned wire circumferentially at the opposite sides of the recess to restore said wire to the original diameter thereof.

In testimony whereof I affix my signature.

WALTER BRUCE WILLS.